United States Patent [19]

Etchemendy et al.

[11] Patent Number: 5,999,182

[45] Date of Patent: Dec. 7, 1999

[54] COMPUTATIONAL ARCHITECTURE FOR REASONING INVOLVING EXTENSIBLE GRAPHICAL REPRESENTATIONS

[75] Inventors: John W. Etchemendy, Menlo Park, Calif.; K. Jon Barwise, Bloomington, Ind.

[73] Assignee: The Board of Trustees of the Leland Stanford Junior University, Stanford, Calif.

[21] Appl. No.: 09/075,372

[22] Filed: May 11, 1998

[51] Int. Cl.[6] .................................................. G06F 15/00
[52] U.S. Cl. ............................ 345/356; 345/326; 706/46
[58] Field of Search .................................. 706/45, 46, 53, 706/54, 55, 56, 57, 58, 59, 60, 61–67; 345/326, 348, 349

[56] References Cited

U.S. PATENT DOCUMENTS

| | | | |
|---|---|---|---|
| 5,778,150 | 7/1998 | Chan et al. | 706/46 |
| 5,778,157 | 7/1998 | Oatman et al. | 706/46 |
| 5,784,540 | 7/1998 | Faltings | 706/46 |

*Primary Examiner*—Ba Huynh
*Attorney, Agent, or Firm*—Lumen Intellectual Property Services

[57] ABSTRACT

A computer architecture supports reasoning tasks involving information represented in graphical form. The architecture supports the creation, storing, display, and editing of a partially ordered set of nodes representing the steps in a reasoning process, as well as representations of information associated with the nodes. Modifications are constrained by rules that support the creation of valid reasoning. In particular, special rules of inheritance place constraints upon what information is available for display and modification at any given point in the reasoning process. The present architecture supports reasoning about any type of graphical representation and about multiple representations within a single reasoning process. In addition, the present architecture supports extensible representations, i.e., representations that may be edited at later points in a proof to extend the range of possible values which may be assigned to their attributes, or to add or delete objects or attributes. The architecture can simultaneously support and integrate the structured reasoning involving both sentential and graphical representations of information. The techniques provided by the invention have application to a wide variety of engineering and scientific practices by improving the processes through which designs and problem solutions are created, assessed, and communicated. It has particular importance and value for complex collaborative projects.

7 Claims, 12 Drawing Sheets

1. ■ { Alan, Barbara and Charles must be assigned to the three vacant offices. } [Given]

2. ■ { Either Alan or Barbara should have the large office at the end of the hall. } [Given]

3. ■ { Alan and Charles should not be in adjoining offices. } [Given]

4. ■ {  } [Given]

5. {
   5.1:1 ■ { 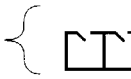 } [Assume]
   5.1:2 ■ {  } [Apply; 3]
   5.1:3 ■ {  } [Apply; 1]

5.2:1 ■ {  } [Assume]
   5.2:2 {
       ■ { 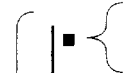 } [Assume]
       ■ {  } [Apply; 1]
       ■ { Case Closed } [Close; 3]            [Exhaustive Cases; 1]
       ■ {  } [Assume]
       ■ {  } [Apply; 1]
       ■ { Case Closed } [Close; 3]
   }
   5.2:3 ■ { Case Closed } [Recursive Close; 5.2:2]
} [Exhaustive Cases; 2]

6. ■ {  } [Merge; 5]

Original proof | After post-editing

FIG. 15

Original proof | After post-editing

FIG. 16

COMPUTATIONAL ARCHITECTURE FOR REASONING INVOLVING EXTENSIBLE GRAPHICAL REPRESENTATIONS

FIELD OF THE INVENTION

This invention relates generally to computer implemented methods for assisting reasoning tasks. More specifically, the invention relates to methods for creating, storing, navigating, modifying, and playing back structured reasoning processes involving representations of information in graphical form.

BACKGROUND OF THE INVENTION

Modern design and problem solving endeavors have become increasingly large and complex, often involving collaborations of many individuals working toward a common goal. Consequently, computers have been used to assist individuals and teams in performing and managing such projects. There are numerous limitations of these existing applications of computers, however, and various important challenges of design and problem solving endeavors remain unassisted by computers.

Large-scale collaborative projects involve many people reasoning toward the solution of a common problem over an extended period of time. The design and construction of a product, whether an automobile, a building, or a complex hardware or software system, involves a multi-disciplinary team of clients and engineers working toward a common goal. Such distributed reasoning projects frequently yield less than optimal results, or even flounder, for lack of techniques for structuring and recording the complex rationales that drive the evolution of the design over the course of the project. Even when a successful outcome is achieved, later modification of the product is often hampered by the absence of an easily understood record of these rationales.

Most reasoning and design problems require the marshaling, manipulation and communication of information represented in a wide variety of formats. For example, in addition to circuit diagrams an engineering team may use state machine diagrams, timing diagrams and logic ladder diagrams, together with algebraic or natural language specifications of the desired input/output behavior, in order to produce a design that meets the client's needs. Until recently, theoretical accounts of reasoning have limited themselves to homogeneous linguistic reasoning, that is, reasoning in which all information is represented in the form of sentences of some language, either natural or formal. This limitation presents a major obstacle to the application of insights about the structure of reasoning to real-world, collaborative problem solving.

Graphical editing programs, such as computer aided design (CAD) and computer aided architectural design (CAAD) programs, permit the creation and modification of graphical representations such as mechanical drawings, floor plans, schematics, and the like. Typically, a graphical editing program maintains, at any given time, a single internal graphical data structure that is successively modified during the course of editing. Some graphical editing programs temporarily store a small number of prior modifications to the current representation. If a mistake is made during a current editing session, an "undo" feature can be used to retract the most recent modification and revert to an earlier version of the representation. These prior modifications, however, are lost when the program closes the representation file, and are not, therefore, part of the stored graphical data structure itself. It should also be noted that this "undo" feature only allows reverting backward in time through a linear historical sequence of edits. Moreover, if a large project involves several distinct but related graphical representations, such as distinct versions of the same drawing, these programs store them as separate, unrelated files.

Version control systems (VCSs) have been developed to maintain and navigate through distinct versions of files. These files include, for example, the source code of computer programs as well as files containing other forms of data. The purpose of a version control system is to maintain a historical record of successive versions of a document and to decrease the likelihood of inconsistent changes being made by multiple users. Version control systems generally accomplish this goal by requiring that a file be checked out before a user can change it. When a document is checked out, the user usually receives a modifiable copy of the most recent version of the document. After the user has made changes, the modified version is checked in and becomes the most recent version. The VCS maintains previous versions as well as the new version, and records the historical relationship between them. In some cases, the VCS may allow multiple users to check out and modify a file independently. If the modifications are consistent in the sense that they modify different parts of the file, the system may allow an automatic merge of the two versions that incorporates both sets of changes. In no case, however, does a VCS permit a prior version of a file to be directly altered. Instead, the prior version is always preserved as part of a historical record and any alterations based on the prior version of the file are part of a new file. In addition, a VCS never permits alterations to the relationships between existing files. It only permits the addition of a new version of a file and relates it to the existing version upon which it is based. A VCS is also characterized by the fact that any file that has not been checked out is available for further editing at any point in time. It should also be noted that a VCS separately tracks the histories of different files. The version history of one file, therefore, will normally have a structure unrelated to the version history of another file. Moreover, if the two files represent distinct but related parts of a common project or reasoning task, such relations between files are not represented as part of the version history of each file.

Programs have been developed to assist users in correctly constructing and recording certain reasoning tasks. These programs, however, are typically limited to very rigorous forms of reasoning using very constrained forms of symbolic representation. Current proof software, for example, permits the creation and recording of proofs that preserve the logical structure and dependencies between sentential propositions used in a piece of reasoning. Existing proof software only permits a single, sentential form of representation to be associated with each step of the proof structure. In general, these sentential forms of representation are sentences drawn from one of the formal, symbolic languages developed in mathematical logic (e.g. "propositional logic," "first-order logic," "second-order logic," "predicate calculus," and "functional calculus"). These sentences must conform to exacting syntactical rules. In addition, the relationships between the sentences in the proof structure must conform to rigorous logical rules. Consequently, these programs are limited to assisting in only the most rigorous problem solving tasks that can be unambiguously and completely represented in a formal symbolic language. In short, they are not useful for the vast majority of problem solving tasks.

Hyperproof, a proof software program designed for teaching rigorous deductive reasoning, supports reasoning about a single, highly constrained "blocks world" graphical representation, i.e. a graphical representation of a grid upon which may be placed one of a few types of predefined geometrical objects. Hyperproof also constrains the editing of any blocks world diagram to edits that restrict predefined attributes of the blocks to specific values. In order to make tractable the problem of supporting rigorous reasoning about a graphical representation, Hyperproof is limited to providing support for a simple and highly constrained graphical representation of a blocks world which cannot be extended in any way through the course of the reasoning process. It does not provide support for general purpose reasoning tasks because it does not support reasoning involving multiple graphical representations, arbitrary types of graphical representations, or graphical representations that can be extended throughout the course of the reasoning process. Consequently, the program has extremely limited practical utility outside the context of teaching deductive reasoning.

OBJECTS AND ADVANTAGES OF THE INVENTION

In view of the above, it is a primary object of the present invention to provide an improved computer implemented method for assisting reasoning tasks. In particular, it is an object of the invention to provide a computational architecture that supports various forms of practical problem solving tasks as well as more rigorous forms of reasoning. Another object of the invention is to provide support for reasoning involving non-sentential, e.g. graphical, forms of representation. Moreover, it is also an object of the invention to provide support for reasoning that simultaneously involves two or more different types of representation, e.g. sentential and non-sentential representations, and integrates them both into a single coherent reasoning structure. Yet another object of the invention is to provide a computational architecture allowing a user (or group of users) to construct, record, edit, and replay a process of reasoning involving multiple distinct non-sentential representations, while maintaining the logical structure of that reasoning. These and other important objects and advantages of the present invention will become apparent in the following description and accompanying drawings.

SUMMARY OF THE INVENTION

A fundamental insight at the basis of the present invention relates to the significant ways in which graphical representations differ from sentential representations in the context of a reasoning process. Sentential representation schemes (languages) have a recursive syntax and a non-additive semantics. As a consequence, reasoning using sentences involves the successive introduction of new sentences into the proof, rather than the incremental modification of existing sentences. In contrast, graphical representation schemes have a flat (non-recursive) syntax and an additive semantics. Thus, when reasoning using a graphical representation, one proceeds by successive or incremental modification of the representation. (If using multiple graphical representations, one proceeds by incremental modification of each of these representations individually, not by syntactically combining different representations.) These characteristic differences between sentential and graphical representations require a reasoning support program that treats these representations in very different ways. The present inventors apparently are the first to clearly recognize how a computational architecture can properly support graphical representations in a reasoning processes.

At the same time, because it is rare that we engage in a reasoning task in which all relevant information is provided in a single format, a useful reasoning support program should allow a proof to contain multiple forms of representation, such as both graphical and sentential representations of information. This capability is particularly important when the reasoning task involves the design of a complex artifact: here the goal of the task may be a graphical representation of the artifact, but the design must satisfy a variety of constraints most naturally expressed using sentences or formulas. The present inventors are apparently the first to recognize how a program can provide meaningful support for a reasoning task that involves several distinct forms of representation. A key insight that enables such meaningful support is the recognition that, despite the important differences between graphical and sentential forms of representation, reasoning involving such heterogeneous forms nevertheless has certain essential structural features which may be implemented in a useful reasoning support system.

In one aspect of the present invention, a computer architecture is provided for supporting reasoning tasks involving heterogeneous forms of representation. The architecture supports the creation, storing, display, and editing of a partially ordered set of nodes representing the steps in a reasoning process. Significantly, this partially ordered set of nodes is not a historical record, but a logical structure. Accordingly, the structure can be edited at any point to reflect developments and changes in the structure of the reasoning process. In particular, nodes at any point in the structure can be added, removed or modified without regard to any historical ordering. The partial ordering of the nodes reflects the recursive nature of reasoning and thus supports the exploration or consideration of multiple distinct logical possibilities.

In addition, the architecture also supports the creation, storing, displaying and editing of graphical representations at various steps within the logical structure of the reasoning process. The modifications to these representations, like the modifications to the nodes themselves, is not constrained by their history. Instead, the modifications are constrained by rules that support the creation of valid reasoning. In particular, special rules of inheritance place constraints upon what information is available for display and modification at any given point in the reasoning process.

An important aspect of the present invention is that the displaying and editing of graphical representations is constrained in such a way that it provides meaningful support for reasoning. Significantly, however, the inventors have discovered techniques for providing meaningful support for reasoning with graphical representations without severely constraining the form of representations or the editing of representations. The present invention, therefore, overcomes the limitations of the prior art programs.

Remarkably, the present architecture supports reasoning about any type of graphical representation and about multiple representations within a single reasoning process. In addition, the present architecture supports extensible representations, i.e., graphical representations that may be edited at later points in a proof to extend the range of possible values which may be assigned to their attributes, or to add or delete objects or attributes. Due to the fact that the unique syntax and semantics of graphical representations—and extensible graphical representations in particular—were not clearly recognized and appreciated until now, no prior reasoning support program has been capable of providing meaningful support for practical reasoning tasks. This meaningful support is largely provided by the partial ordering of the steps of the reasoning process, as well as by constraints imposed on the inheritance of information within the structure.

An important aspect of the present invention is that it provides an architecture that simultaneously supports and integrates the structured reasoning familiar from our understanding of sentential reasoning with the use of graphical representations. This is an important innovation because sentential and graphical representations figure into reasoning in significantly different ways. In sentential reasoning, an individual inference typically consists of the introduction of a new sentence that is justified by citing other sentences obtained at earlier stages in the reasoning process. In contrast, when a graphical representation is introduced into a piece of reasoning, one and the same representation typically remains for an extended portion of the reasoning, and successive inferences are characterized by successive modifications to that very representation. Thus it is the incremental modification, not the entire content of the representation, that is the relevant unit of graphical information to be associated with a reasoning step.

Because the present invention provides, for the first time, an architecture for fully supporting a reasoning process involving graphical as well as sentential forms of representation, it has the potential to affect a wide variety of engineering and scientific practices by improving the processes through which designs and problem solutions are created, assessed, and communicated. It has particular importance and value for complex collaborative projects. The present invention is potentially applicable in any domain in which reasoning employs one or more forms of non-textual representations, which includes virtually every scientific and engineering discipline.

In one aspect of the invention, a computer implemented method is provided for assisting a user engaged in a reasoning task. The method comprises:

a) storing in a memory a data structure comprising: i) a partially ordered set of nodes (N, >), ii) a set R of representations, wherein at least one representation r in R is a graphical representation comprising an original edit $d_0$ and a (possibly empty) set of incremental edits $d_1, \ldots, d_L$, and iii) a function f:r→N assigning to each edit $d_i$ in r an associated node $f(d_i)$ in N, wherein $f(d_i) \geq f(d_0)$ for all i;

b) displaying to the user an instance r[n] of the representation r at a user-selected node n, wherein the instance r[n] is the set of all $d_i$ in r such that $n \geq f(d_i) \geq f(d_0)$;

c) receiving from the user an instruction to introduce at the node n in N an edit $d_{L+1}$ to the graphical representation r; and d) modifying the data structure to introduce at n the edit $d_{L+1}$ to r, provided: i) $n \geq f(d_0)$; and ii) r is extensible, or $n = f(d_0)$, or the edit $d_{L+1}$ at n does not extend r.

In another aspect of the invention, the original edit $d_0$ of the graphical representation r comprises a set of graphical objects, each having a set of attributes and corresponding attribute value ranges, and wherein condition d) ii) fails if 1) r is defined to be a non-extensible representation, and
2) $n \neq f(d_0)$, and
3) one or more of the following propositions is true:
 a) the edit $d_{L+1}$ adds an object to r;
 b) the edit $d_{L+1}$ deletes an object of r;
 c) the edit $d_{L+1}$ adds an attribute to an object of r;
 d) the edit $d_{L+1}$ deletes an attribute of an object of r; and e) the edit $d_{L+1}$ extends an attribute value range of an attribute of an object of r.

In yet another aspect of the invention, the set R of representations is a heterogeneous set of representations comprising at least two distinct types of representation. Examples of various types of representations are: a spreadsheet, a CAD drawing, a chemical structure diagram, a topological diagram, a Feynman diagram, an electrical schematic, an architectural drawing, an artistic drawing, a 3D model, an animation, a motion picture, a table, a Venn diagram, a Euler diagram, a blocks world diagram, a position diagram, a Boolean truth table, a binary decision diagram, a graph, a flowchart, a mathematical sentence, a computer program, a logical sentence, and a linguistic expression.

In another aspect of the invention, the edit $d_{L+1}$ of r comprises an edit selected from the group consisting of: a) an addition of an object to r; b) a deletion of an object from r; c) an addition of an attribute to an object of r; d) a deletion of an attribute of an object of r; e) an extension of an attribute value range of an attribute of an object of r; f) a partial restriction of an attribute value range of an attribute of an object of r; g) a complete restriction of an attribute value range of an attribute of an object of r; and h) a specification of an attribute value within an attribute value range of an attribute of an object of r.

In other aspect of the invention, the method comprises the step of modifying the partially ordered set of nodes (N, >) by a structural edit, wherein the structural edit is a deletion of a node in the set N, an addition of a node to the set N, or a change in partial ordering on the set N.

DESCRIPTION OF THE FIGURES

FIG. 2 is an example of a reasoning process involving both graphical and textual forms of representations, in accordance with the teaching of the invention.

FIGS. 8 and 9 illustrate the inheritance relation on nodes of a proof through two examples, in accordance with the teaching of the invention.

FIG. 15 illustrates how a new value is displayed until superseded by a different value assigned in a descendant graphic, in accordance with the teaching of the invention.

FIG. 16 illustrates how a modification of an existing value can alter the editing constraints imposed on descendant graphics, in accordance with the teaching of the invention.

DETAILED DESCRIPTION

Although the following detailed description contains many specifics for the purposes of illustration, anyone of ordinary skill in the art will appreciate that many variations and alterations to the following details are within the scope of the invention. Accordingly, the following description is set forth without any loss of generality to, and without imposing limitations upon, the claimed invention.

In the context of the present description, a reasoning task is defined broadly as any task involving the use of some degree of logical structure to meet a specified goal, and/or to explore possible consequences of given information. Thus, a reasoning task includes not only a task whose goal is to rigorously demonstrate that a particular claim is a deductive consequence of some given information (e.g., a mathematical proof), but other more general and informal types of reasoning tasks as well. For example, designing an object or procedure that satisfies certain specifications is a reasoning task. Exploring possible consequences of given assumptions in order to evaluate various courses of action is a reasoning task. Reasoning tasks include, but are not limited to, various types of planning, modeling, designing, arguing, decision making, exploration, and investigation.

In general, a reasoning task may involve information having multiple representational forms, e.g. linguistic or mathematical sentences, graphical figures, schematic drawings, audio and/or visual data, computational algorithms or data structures, and various combinations thereof. A graphical representation is defined broadly as any non-sentential representation of information, such as, for example, diagrams, pictures, layouts, blueprints, flowcharts, figures, graphs, maps, charts, tables, spreadsheets, animations, video, and 3D models. A reasoning task may also involve multiple representations, each expressing a distinct portion of the information relating to the reasoning task. In addition, a reasoning task typically involves the modification of representations through extension of their content or possible content.

A computational architecture for reasoning is defined to be a computer implemented method, whether implemented in hardware or software, that allows a user to construct, record, edit, and replay a process of reasoning so that the structure of the reasoning is maintained. A user of a computational architecture for reasoning is defined to include both an individual working alone as well as a group or team of individuals working jointly toward the solution of a given reasoning task. So, for example, a team of architects working on the design of a building would constitute a user engaged in a reasoning task.

Figure 1:
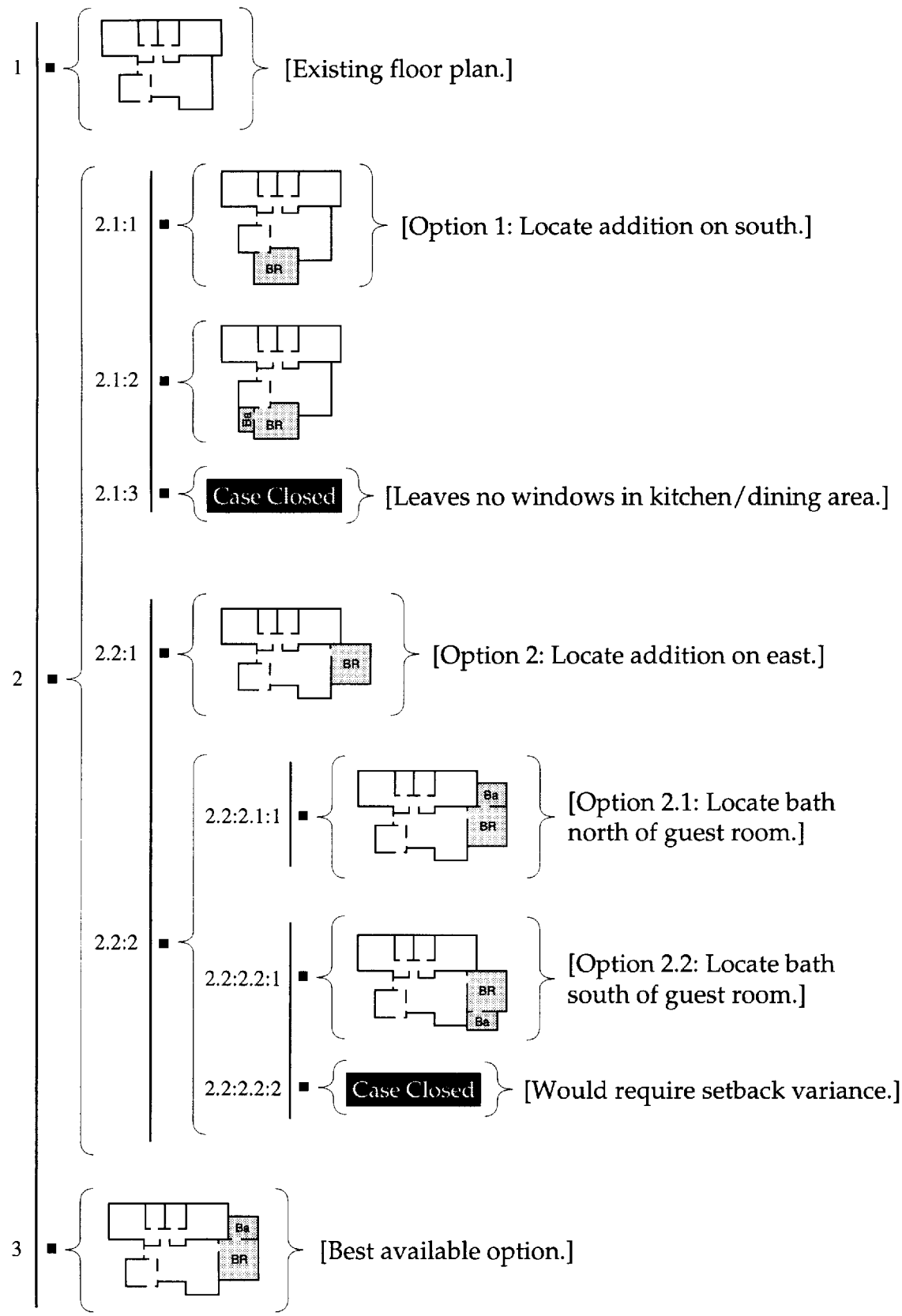
FIG. 1 shows a simple proof prepared by an architect designing an addition to an existing house, in accordance with the teaching of the invention.
Figure 3:
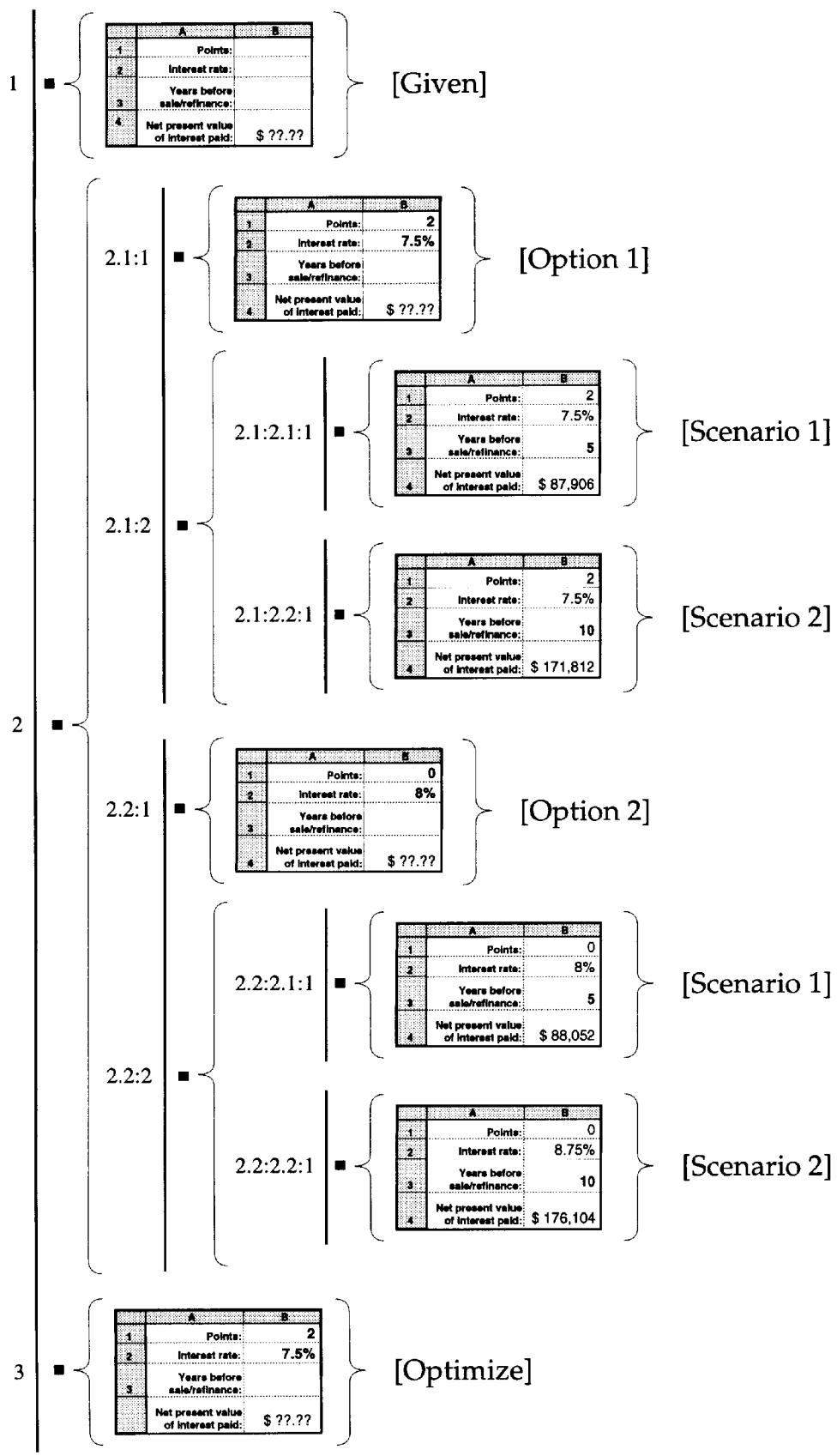
FIG. 3 illustrates a simple proof used for financial planning, in accordance with the teaching of the invention.
Figure 4A:
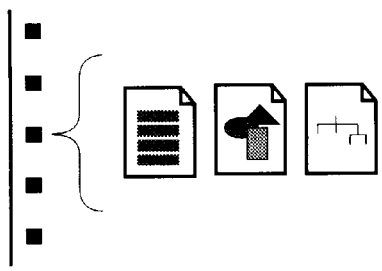
FIG. 4a shows an example of three representational edits associated with incremental information at a node in a proof, in accordance with the teaching of the invention.
Figure 4C:
FIG. 4c shows an example of annotational information about a step in a proof, in accordance with the teaching of the invention.
Figure 4B:
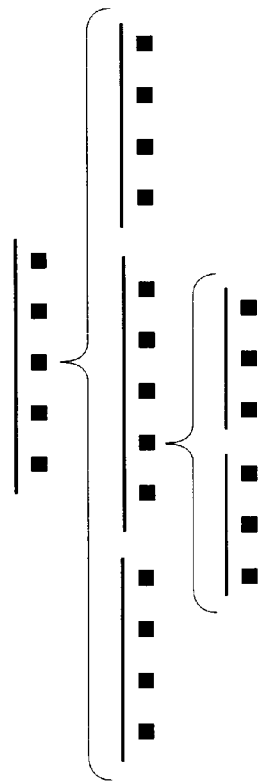
FIG. 4b shows subproofs associated with nodes in a proof, in accordance with the teaching of the invention.
Figure 5:
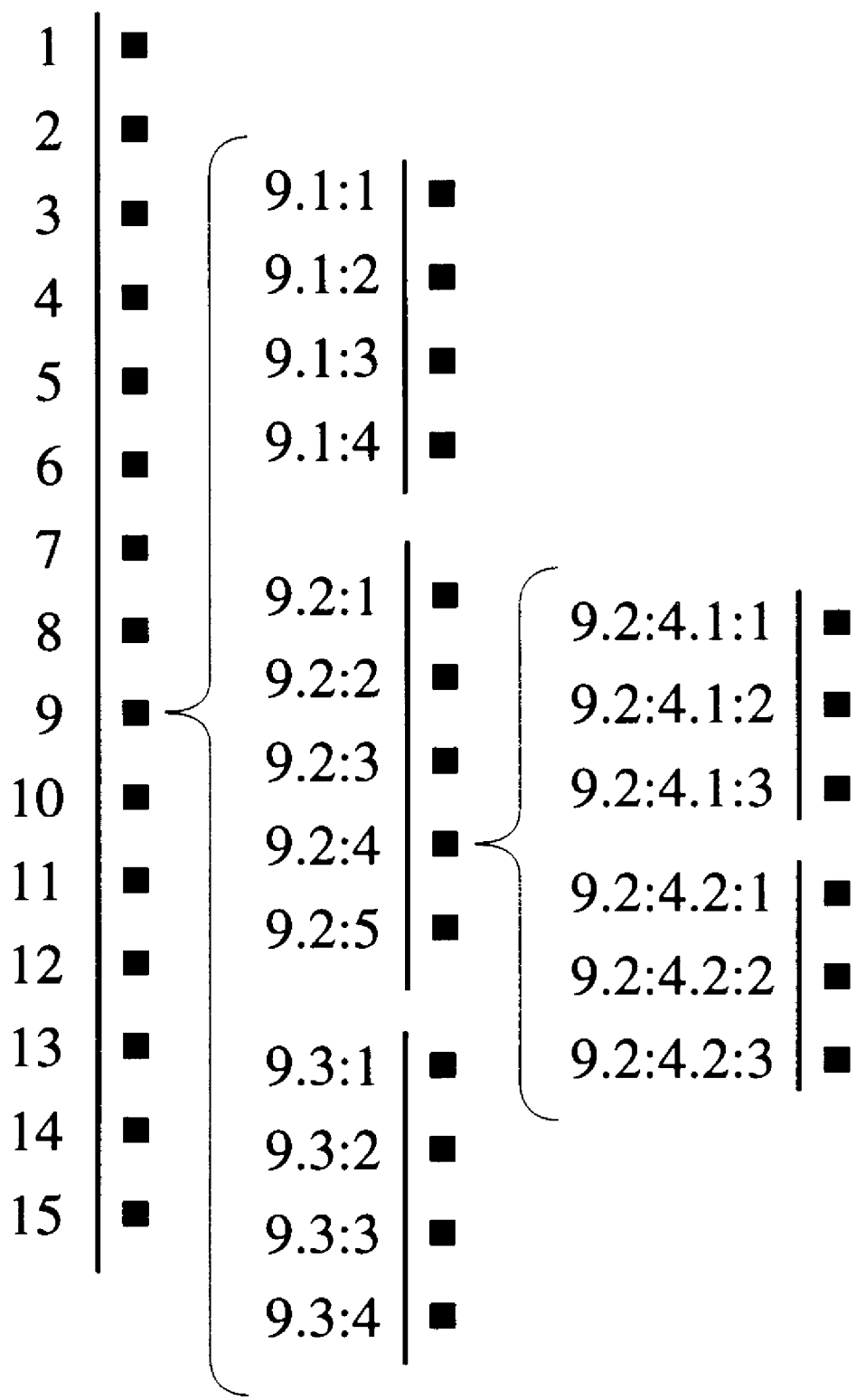
FIG. 5 illustrates a numbering scheme that reflects the recursive structure of a proof, in accordance with the teaching of the invention.
Figure 6:
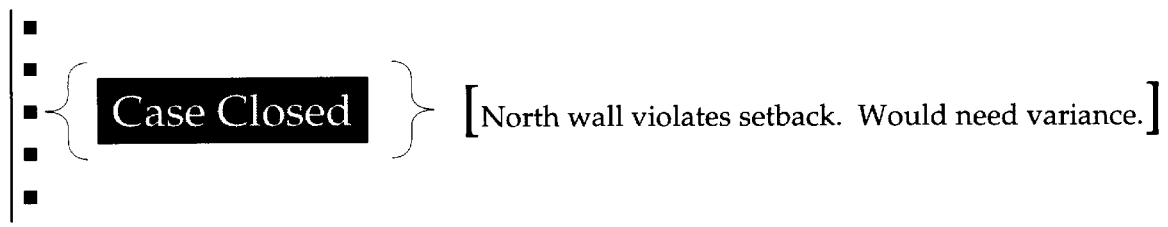
FIGS. 6 and 7 show examples of annotations used to justify steps in a reasoning process, in accordance with the teaching of the invention.
Figure 7:
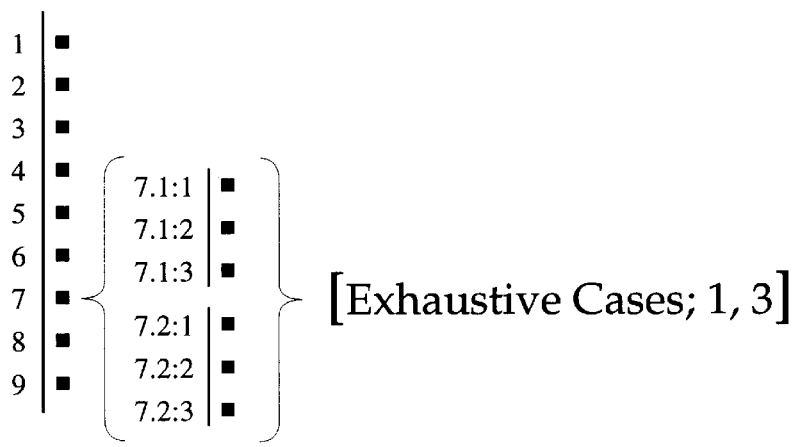

A proof is defined in the context of the present description as a data structure that records a logically structured reasoning process that represents a (possibly partial) execution of a reasoning task. A proof can be represented as an ordered sequence of steps (or nodes), each of which may contain a) a nonempty set of representational edits expressing incremental information about the subject matter of the reasoning task, b) information about that step in the proof or about the state of the proof as a whole at that step, or c) a nonempty set of subsidiary proofs (called subproofs). Thus, a proof is, in general, a recursive structure having subproofs which themselves may contain subproofs. FIGS. 1, 2 and 3 illustrate three concrete examples of simple proofs constructed in the performance of various practical reasoning tasks. FIG. 4a shows an example of three representational edits associated with incremental information at a node in a proof. FIG. 4c shows an example of annotational information about a state of a proof. FIG. 4b shows subproofs associated with nodes in a proof. Nodes in a proof, shown as small squares in the figures, may be numbered in various ways. One such numbering scheme that reflects the recursive structure of the proof is shown in FIG. 5.

FIGS. 1, 2 and 3 illustrate a few of the many potential applications of the invention. Although the reasoning illustrated in these figures has been simplified for sake of illustration, it is important to understand that the architecture supports very complex reasoning and design tasks. Most crucially the architecture can maintain large numbers of non-textual representations of multiple types as they evolve through the reasoning process, and record their informational dependencies. It has also been designed to facilitate collaboration by allowing multiple users to work simultaneously on different parts of a proof or different goals.

FIG. 1 shows a simple proof prepared by an architect designing an addition to an existing house (shown at step 1). The client wants to add a guest bedroom and bath; the architect's proposed solution is shown at step 3. This solution is the result of a structured reasoning process that is recorded in the proof. The proof is a record of the rationale for the decisions incorporated into the final design, and can be used to present the reasoning to colleagues and clients.

FIG. 2 is an example of a reasoning process involving both graphical and textual forms of representations. The reasoning task concerns the assignment of offices, represented diagrammatically in the proof, based on a variety of constraints that are expressed sententially. The reasoning shows that there is only one possible assignment that satisfies the stated constraints.

FIG. 3 illustrates an application of a computational architecture for reasoning to the very different domain of financial planning. In this example, the user is deciding between a mortgage at 7.5% interest, with two points, and one at 8% interest, with no points. The user envisages two salient scenarios: one in which he is transferred out of town in five years; the second where he keeps the house for ten years. The reasoning shows that under either scenario, the optimal choice is the former mortgage.

Proof Structure and Information Inheritance

The ordered sequence of steps in a proof, excluding subproof steps, is called the top level or first level of the proof. In FIG. 1 these steps are numbered 1, 2, and 3. A subproof of the first level of the proof is called a second level of the proof, and the first level is said to be the parent proof of the subproof. In FIG. 1, step 2 has two subproofs. The first subproof has steps numbered 2.1:1, 2.1:2 and 2.1:3. The second has steps numbered 2.2:1 and 2.2:2. A subproof of a second level of the proof is called a third level of the proof and has the second level as its parent. In FIG. 1, for example, step 2.2:2 has two subproofs.

A proof has the structure of a partially ordered set. The partial ordering of a proof defines an inheritance relation on the nodes of the proof. In particular, we say a node A is accessible from a node B, and write A<B, if either one of the following conditions holds true:

1) A and B are both contained in the top level of the proof or in the same subproof and A strictly precedes B, or
2) B is in a subproof contained by a node from which A is accessible (either directly or recursively by virtue of this clause).

Figures 8, 9:
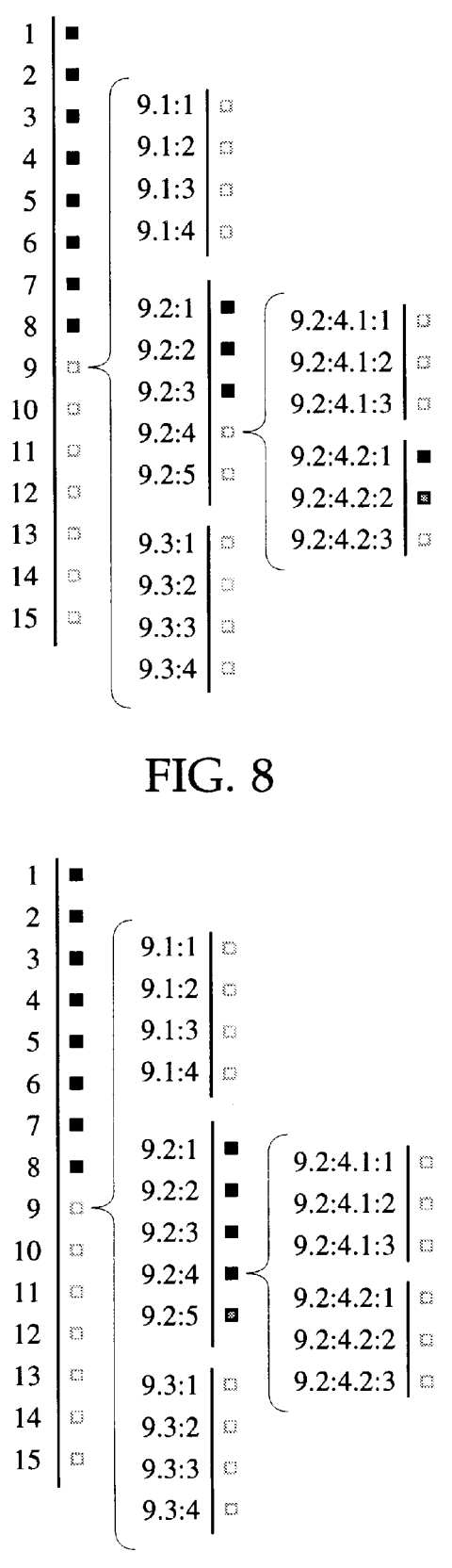

FIGS. 8 and 9 illustrate the inheritance relation on nodes of a proof through two examples. The example in FIG. 8 shows the set of all nodes accessible from a shaded node 9.2:4.2:2 as solid nodes. Note that nodes in subproofs at the same level as the shaded node are not accessible, but certain nodes in parent proofs are accessible. The example in FIG. 9 illustrates the fact that nodes in subproofs are not accessible from parent proofs. In the concrete case of FIG. 1, some valid inheritance relations between nodes are as follows:

1<2

1<3

1<2.1:1

1<2.1:2

2.1:1<2.1:2

The following relations, however, are not valid:

2<1

2.1:1<3

2.2:2<3

2.1:2<2.1:1

2.1:1<2.2:1

Figure 10:
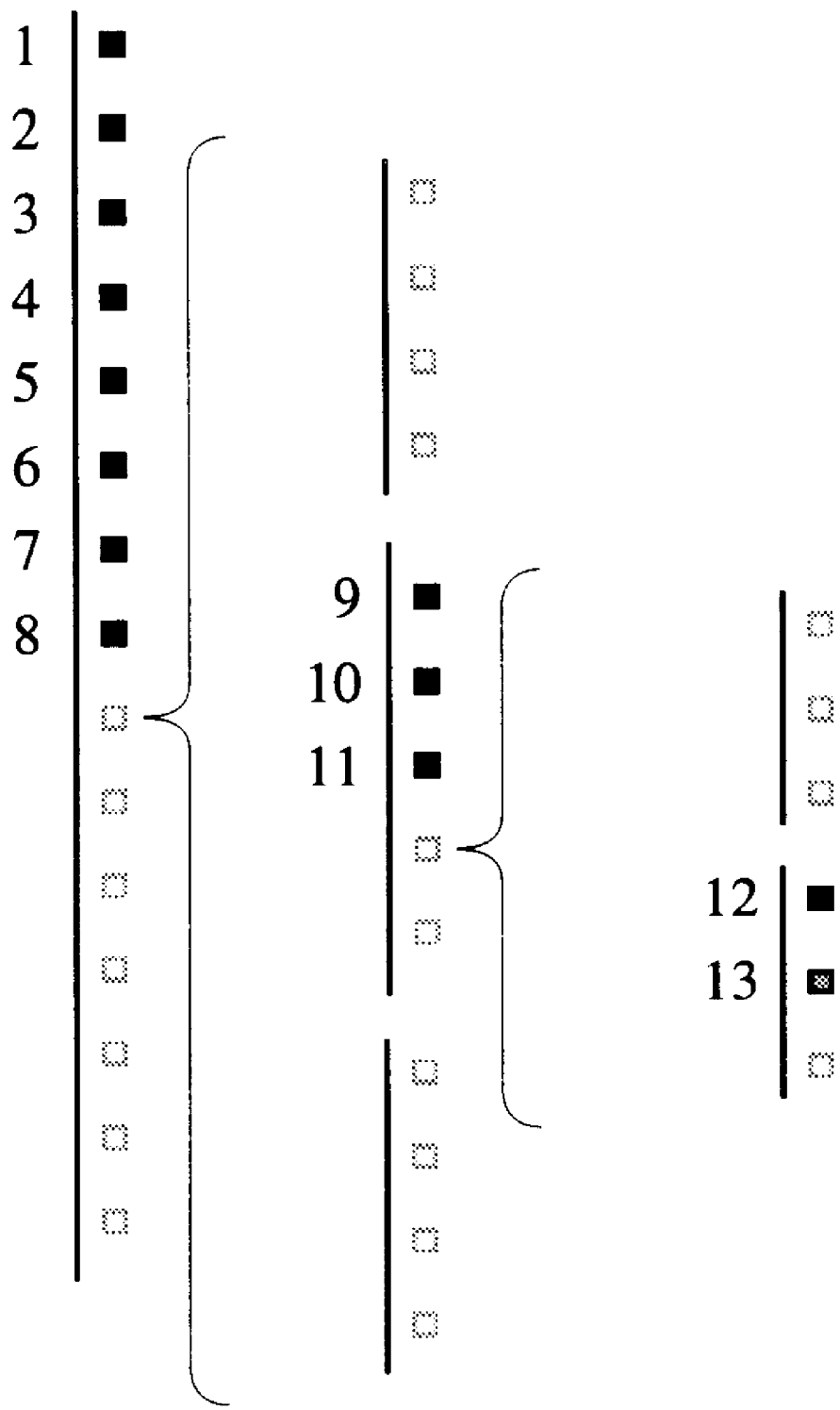
FIG. 10 shows the provenance of a shaded node as the set of all solid nodes, in accordance with the teaching of the invention.

Although the nodes of a proof in general form a partial (not linear) order, when we restrict attention to the nodes accessible from a specified node, these nodes are linearly ordered. Thus, we define the provenance of a node B to be the unique, linear sequence of nodes A that are accessible from B, i.e., all nodes A such that A<B. For example, FIG. 10 shows the provenance of a shaded node as the set of all solid nodes. In FIG. 1 the provenance of node 2.2:2 is the linearly ordered sequence of nodes {1, 2.2:1, 2.2:2}, and the provenance of node 2.2:2.2:2 is {1, 2.2:1, 2.2:2.2:1, 2.2:2.2:2}.

The accessibility relation is an important constraint that determines the inheritance of information in a proof. In general, any information expressed at node A is available at (or inherited by) node B, whenever A is accessible from B, i.e., whenever A<B. The collection of all information available at a node B is called the cumulative information at B. In other words, the cumulative information at B is the sum of the information expressed at nodes in the provenance of B.

Display and Editing of Representations

Figure 11:
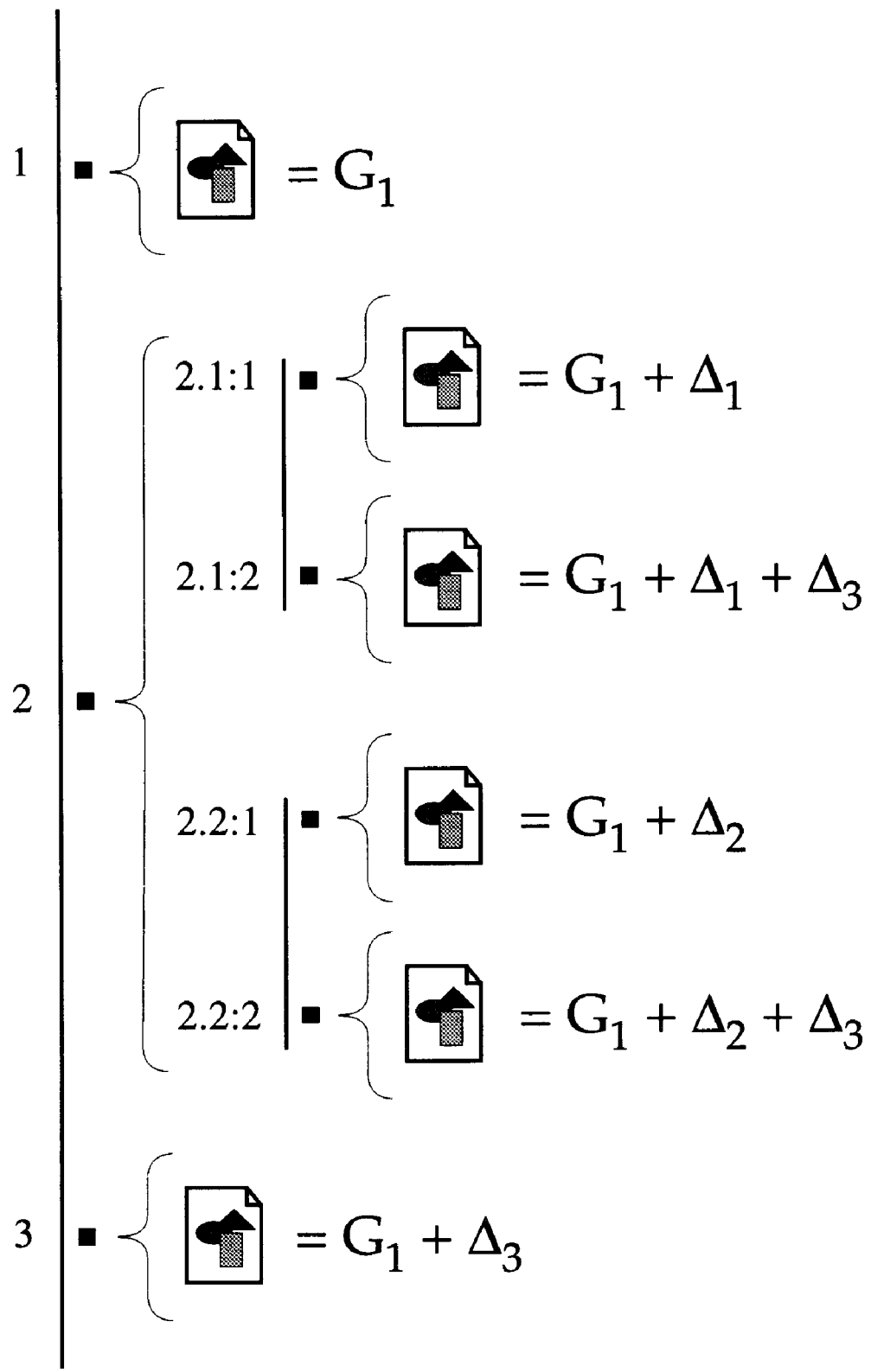
FIG. 11 illustrates a proof in which graphical information $G_1$ of a representation G is first introduced at node 1, in accordance with the teaching of the invention.

A representation is defined to be a set of informational edits in a proof. An informational edit is any information associated with a node in the proof. The node of origin of a representation is the node at which information associated with the representation is first introduced. Because each representation has a unique node of origin, it may be unambiguously referred to by the information introduced at its node of origin. FIG. 11 illustrates a proof in which graphical information $G_1$ of a representation G is first introduced at node 1. Note that a single node may be the node of origin of several representations.

An application constructed in accordance with the present invention allows information relevant to a reasoning task to be represented using one or more forms of graphical representation. Thus, in addition to (or in lieu of) sentences or formulas drawn from traditional languages, nodes in a proof can contain graphical representations. The nature or format of these graphical representations is not limited, and can provide a wide variety of applications, each providing the user with graphical representations suited to a different set of tasks. An application based on the principles of the present invention will provide, for each type of graphical representation supported, a suite of tools or routines for editing representations of the type in question.

The presence of graphical representations in a proof requires special techniques for properly handling information inheritance for graphically displayed information, as well as appropriate editing restrictions that respect the inheritance structure of the proof.

A key insight at the basis of the present invention is that the availability of information at nodes in a proof manifests itself in one of two ways. Information is implicitly available at node B if the information is available at B but not expressed in the representations at node B. In sentential reasoning, information inheritance is typically implicit, since information introduced at an earlier node A is usually not expressed at a later node B. The cumulative information implicit at a node B may be used as support for assertions made at node B, but is not normally explicitly expressed at B.

Information is explicitly available at node B, on the other hand, if the information is available at B and also expressed at node B. In graphical reasoning, information inheritance is typically explicit, since graphical information is generally displayed at later nodes from which it is available. In FIG. 11, for example, the information $G_1$ introduced at node 1 is explicitly available, and thus generally displayed, at every node of the proof. Information can be displayed and edited at a node if and only if it is available at that node. If graphical information is available at a node, an edit of that information at the node introduces incremental information that is associated with the representation and with the node at which the edit is made. For example, in FIG. 11 information $G_1$ is available at node 2.1:1, and an edit $\Delta_1$ is made at this node which introduces incremental information to the representation. The cumulative information at this node is $G_1+\Delta_1$. This information is inherited by node 2.1:2 where another edit $\Delta_3$ introduces more incremental information to the representation. Note that although edit $\Delta_1$ is part of the representation, $\Delta_1$ is not available at all nodes where the representation (i.e. $G_1$) is available.

An implementation of the present invention keeps track of modifications to graphical representations and at which nodes in a proof these modifications are made. Generally speaking, the location of a modification has an impact both on where the modification is displayed and on what subsequent modifications can be made to the representation at later nodes in the proof. The basic intuition is that if a modification at a particular node introduces incremental information, that information is inherited at later nodes. But since inheritance of graphically expressed information is explicit, subsequent modifications to the representation should preserve that information. Thus the information content of a graphical representation should increase monotonically as we follow any accessibility path through a proof.

Application programs based on the invention will not and cannot enforce this monotonicity requirement universally, due to the range and variety of graphical representations to which the invention may be applied. Systems of graphical representation vary widely in the extent to which they have fixed or intended interpretations. For example, circuit diagrams, architectural drawings, and perc charts have highly conventional interpretations, while the representations created in free-form drawing programs have no fixed interpretation, yet can be employed to represent a wide range of contents. Because of this, implementations of the invention will differ in the extent to which they can antecedently recognize which modifications of a graphical representation are intended by the user to be informationally significant. Hence, implementations will differ in the extent to which they rely on the user to guarantee monotonicity versus imposing editing constraints whose goal is to enforce it.

Because different nodes of a proof do not have the same cumulative information, an implementation of the present invention will typically maintain a record of which node the user is located at for purposes of display and editing. We call this node the user's focus. A user interface having proof navigation mechanisms allows the user to arbitrarily change the focus from one node to another, and make edits at any node, provided the intended edits satisfy the constraints of the specific implementation of the invention.

If a graphical representation G is available at a node of focus B, a graphic $G_B$ is the display of all information associated with G that is available at B. The graphic $G_B$ is called an instance of the graphical representation G. If graphic $G_A$ at node A and graphic $G_B$ at node B are instances of the same graphical representation G, and A<B, then $G_A$ is said to be an ancestor of $G_B$, and $G_B$ is said to be a descendant of $G_A$. If $G_A$ and $G_B$ are instances of the same graphical representation G but neither A nor B is accessible from the other, then $G_A$ and $G_B$ are said to be cousins.

An informational edit associated with a representation typically includes an introduction of or modification to one or more objects expressing specific information of the representation. For example, a graphical representation such as a geometrical diagram might contain graphical objects such as circles, squares, lines, and curves. A representation such as a spread sheet might contain objects such as formulas. A sentential representation might contain an object of such as a sentence in first order logic. An object of a representation typically has a set of attributes expressing specific information of the object. For example, a circle in a graphical representation may have attributes such as center, radius, line thickness, line color, and fill color. A formula in a spread sheet representation typically has a numerical or alphanumeric variable as an attribute. Each attribute generally has an attribute value range, and an attribute value. The attribute value range is the set of possible attribute values that may be assigned to the attribute. For example, if the attribute value range of the radius attribute of a circle is the set of integers between 1 and 10, then the attribute may be assigned any value within this range. The attribute value is the specific value assigned to the attribute.

If an attribute value has not been assigned, the attribute is said to have an indefinite attribute value within the attribute range. An attribute has a definite attribute value if the attribute value range is restricted to one possible value, or if a specific attribute value is assigned to the attribute. If an attribute permits its attribute value range to be extended to include additional possible attribute values, it is called an extensible attribute. Similarly, an extensible object is an object which contains extensible attributes or permits the addition or deletion of attributes. An extensible representation is defined to be a representation which contains extensible objects or permits extension by the addition or deletion of objects. A non-extensible representation, therefore, is a representation which has a fixed number of objects, and has no extensible objects. A non-extensible object is an object which has a fixed number of attributes and has no extensible attributes. Note that an extensible representation may contain non-extensible objects provided it contains at least one extensible object, and an extensible object may contain non-extensible attributes provided it contains at least one extensible attribute.

In the case of an extensible representation permanent incremental edits do not impose ultimate constraints upon edits introduced by the user. Nevertheless, an implementation of the invention may impose default constraints which must be manually over-rided by the user prior to allowing an edit that extends the extensible representation beyond limits imposed by a prior permanent incremental edit. Because the representation is extensible, the system will allow the representation to be extended manually in this manner, even though the system attempts to constrain the extension by default. In the case of a non-extensible representation, however, extensions are strictly prohibited by the system. The system may allow a user to manually redefine the representation, changing it from a non-extensible to an extensible representation. After the representation is redefined, it could then be extended.

Incremental Edits

Edits of graphical representations may be divided into two types: incremental edits and presentational edits. An incremental edit is an edit at a node that adds incremental information to a representation available at the node. The incremental information could be, for example, an addition or deletion of an attribute or object, a modification of an attribute value range, or a specification of an attribute value. An incremental edit conforms to the inheritance structure of the proof, and hence is the appropriate edit type to use when making informationally significant changes to a representation. When an incremental edit is made to a graphical representation G at node N of a proof, the modification is displayed in the graphic $G_N$ and in all descendants of $G_N$, until the modification is superseded by changes made at subsequent nodes. If a subsequent edit superseding the change made at N is made at node L>N, the modification made at N is displayed in the graphic $G_N$ and in any graphic $G_M$ where L>M>N. Incremental edits made to $G_N$ have no effect on the ancestors or cousins of $G_N$.

Most incremental edits are edits of attribute values. These edits can be constrained or unconstrained. An unconstrained incremental edit made to an attribute value places no additional constraints on the modifications that can be made at descendant graphics. Thus, an unconstrained incremental edit is the assignment of a specific value to an attribute without limiting its attribute value range. Such an edit to a graphic $G_N$ modifies the displayed values of the attribute in $G_N$ (and its descendants), but does not change the range of permissible values associated with the attribute in descendant graphics.

A constrained incremental edit is a modification of an attribute that assigns a specific value to an attribute and also narrows its attribute value range. Constrained incremental editing has the effect of limiting what subsequent attribute values may be assigned to the attribute at descendant nodes without extending the attribute value range itself with an additional deliberate edit. Note that attribute value ranges can not be extended in any non-extensible representation, non-extensible object, or non-extensible attribute.

The most highly constrained form of incremental editing is permanent editing. A permanent incremental edit is a constrained incremental edit which narrows the attribute value range to just one value. Thus, a permanent incremental edit necessarily assigns a specific value to the attribute as well. A permanent incremental edit made to an attribute value of a graphic $G_N$ is a modification that cannot be subsequently retracted or superseded in the descendants of $G_N$ unless the attribute value range itself is deliberately edited in those descendants. Thus, a permanent incremental edit modifies the displayed value of an attribute of $G_N$, and in addition restricts the attribute value range in descendant nodes to exactly the value assigned to the attribute. Subsequent modifications to the graphical representation can change the values assigned to other attributes, but cannot alter the values of the attribute specified by the permanent incremental edit without directly extending the attribute value range.

Note that attribute value ranges can only be extended in the case of extensible representations. If a permanent incremental edit is made to a non-extensible representation, object, or attribute, then the attribute value assigned by the edit is truly permanent in all descendant nodes. Note also that editing a graphic at a node does not impose additional editing constraints on the graphic at that same node, but rather on descendant graphics. At any given node the user is freely allowed to modify the incremental information at that node, but must respect any constraints imposed by the graphically displayed information inherited at that node.

For many applications of the present invention, permanent incremental editing can be effectively used to ensure that any piece of information established at a particular node in a proof will be available at any node from which the node in question is accessible. If that information is recorded as a modification to a graphic, then for many systems of graphical representation, the specific modification must be inherited by all descendant graphics. Permanent incremental editing guarantees that this will be the case, since the modification cannot be subsequently altered at a later (descendant) node. A permanent edit can, however, be retracted or modified at a later time, but the modification must be made at the node where the original edit was made, or a node logically prior to that node. This imposes a practical restriction that aids users in the successful completion of the reasoning task: A conclusion or decision that was previously made cannot be retracted without navigating to the node associated with that modification and reviewing the original justification. This restriction becomes particularly important if the proof is being constructed by multiple users or if the construction takes place over an extended period of time.

Figure 12:
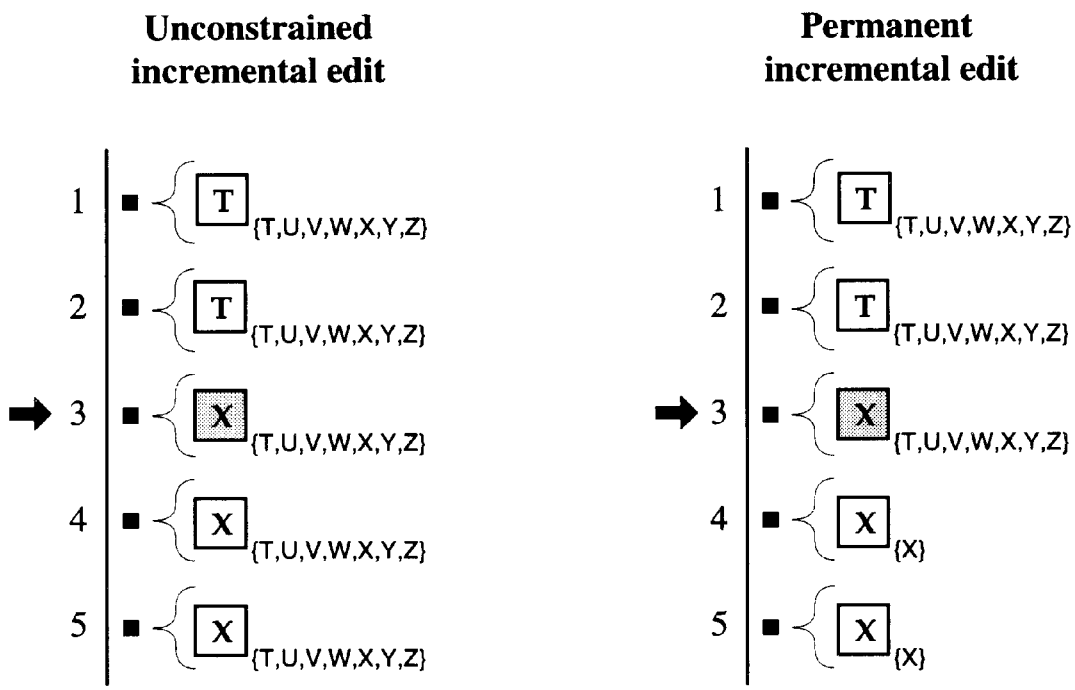
FIG. 12 illustrates the effects of an unconstrained incremental edit as contrasted with the effects of a permanent incremental edit made at the same node, in accordance with the teaching of the invention.

In FIG. 12 the effects of an unconstrained incremental edit are contrasted with the effects of a permanent incremental edit made at the same node. The illustration depicts a simple representation consisting of a single attribute that can be assigned one of seven values (T, U, . . . , Z). The value assigned to the attribute at each node is shown in the corresponding square. In addition, the square is annotated to indicate the attribute value range at the node. In both proofs an incremental edit is made at node 3, where the value of the attribute is changed from T to X. Where the permanent edit differs from the unconstrained edit is in its effect on the range of permissible values of the attribute at subsequent nodes. In the proof on the right, the possible values reduce to X in the nodes following the one at which the change is made. Thus in the proof on the left, the user would be permitted to further edit the value of the attribute at nodes 4 and 5; in the proof on the right, the value is fixed at these nodes.

Figure 13:
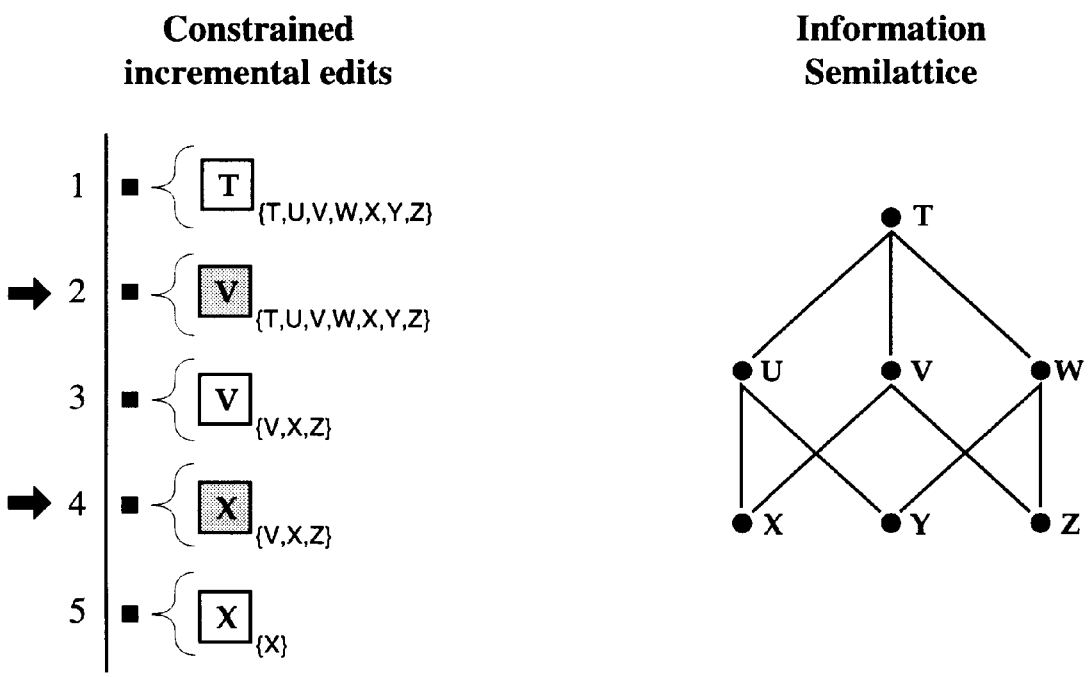
FIG. 13 illustrates an example of constrained incremental editing, in accordance with the teaching of the invention.

FIG. 13 illustrates an example of constrained incremental editing, once again assuming a graphical representation containing a single attribute that can be given seven possible values. In this example, however, we have assumed that the values have fixed conventional interpretations, and that the relative significance of the values is expressed by the information semilattice shown on the right of the figure. The value T is a "null" value, consistent with any possible assignment to the attribute, while the values X, Y, and Z are maximally informative and mutually incompatible. The values U, V, and W are intermediate values: U is consistent with either X or Y; V is consistent with X or Z; and W is consistent with Y or Z. In the proof shown on the left, we depict incremental edits made at nodes 2 and 4. At node 2, the value of the attribute is changed from T to V. This increments the information contained at the node, and hence subsequent changes to the graphical representation are constrained to those that express further refinements of that information. At node 4, the value is changed from V to X, again incrementing the information provided by the graphic. Since this value is maximally informative, no further modifications are allowed at node 5. A constrained incremental edit, therefore, corresponds to a restriction of an attribute value range.

All implementations of the present invention must implement one or more forms of incremental editing. Some implementations will employ only forms of constrained incremental editing tailored to the system or systems of graphical representation supported by the application. Other implementations will allow unconstrained incremental editing, either because the graphical representations they employ do not have sufficiently well-defined interpretations capable of supporting an antecedently specified system of editing constraints, or because the nature of the reasoning tasks targeted by the application require the use of unconstrained editing. This is frequently the case when the reasoning supported has a temporal or planning dimension. In such applications, a piece of reasoning may begin with a graphical representation of the current state of the subject matter in question (e.g., the current design of a product), and proceed to reason about possible modifications of that state (design). In such cases, any feature of the current state that is potentially subject to modification in the solution will be represented by an unconstrained incremental edit in the initial graphic, while changes to the design can appropriately be made with constrained (or permanent) incremental edits. Applications that allow both permanent and unconstrained incremental editing may provide devices for distinguishing features of a graphic that are permanent from those that are not, and may also provide functions that enable users to "lock" a previously unconstrained incremental edit at a node, that is, make the feature behave like a permanent incremental edit made at that node.

Editing a graphic located at a node can alter subsequent graphics in two distinct ways. On the one hand, changing the existing value of an attribute will have the expected effect on how the attribute is displayed in descendant graphics: the new value is displayed until superseded by a different value assigned in a descendant graphic. An example of this sort of editing is depicted in FIG. 15, where the proof from FIG. 9 is modified by changing the value of the attribute at node 2 from V to U. The new value is then inherited by descendant graphics until it is subsequently changed to X.

On the other hand, the modification of an existing value can alter the editing constraints imposed on descendant graphics, and so render an edit impermissible that was formerly permitted. An example of this situation is depicted in FIG. 16, where the value at node 2 is changed from V to W. A consequence of this change is that the range of permissible values at node 4 no longer includes the value X. Thus the change at node 2 precludes the assignment of X at node 4, and the latter assignment is wiped out. In situations of this sort, when a modification precludes an edit already made at a descendant node, a program that permits such modifications will typically warn the user of the effects of the modification.

Presentational Edits

In addition to incremental edits, graphical representations can be modified by presentational edits. A presentational edit of a graphical representation available at a node alters the appearance of the representation, but does not increment the information associated with the representation. A spot edit at a node is a presentational edit that alters only the appearance of the edited representation at that node. A spot edit does not affect either the display or editing constraints in effect in any other instance of the representation. An example of a spot edit is the gray shading of nodes 2 and 4 in FIG. 13.

A backdrop edit at a node is a presentational edit that alters the appearance of a representation at every graphic that is an instance of the representation, except a) in graphics that contain, or are descendants of graphics that contain, incremental edits which preclude the display of the backdrop edit, or b) in graphics that contain spot edits which preclude the display of the backdrop edit. The value of a backdrop edit can be modified at any node in which it is displayed. Thus, for purposes of editing and display, a backdrop edit is treated like an unconstrained incremental edit made at the node of origin of the graphical representation.

The purpose of backdrop edits is to introduce or change pervasive features of the graphical representation throughout the proof. They are appropriate for graphical features that are either meant to carry no significant information (e.g., the background color of a diagram or the font in a spreadsheet cell) or meant to represent background information presupposed throughout the reasoning (e.g., the property lines in an architectural drawing).

A graphical editor provided by an application of the present invention may or may not support these or other forms of presentational editing, and those that do support presentational editing may restrict its use in various ways. For example, an application may restrict spot and backdrop edits to special "layers" of the graphic, allowing only incremental editing on the graphic's primary layer.

Structural Edits

An implementation of the present architecture must provide a means for creating and modifying a proof structure, including functions that add new nodes and attach representations, subproofs or annotations to those nodes. Since the purpose of the invention is not to provide a historical record of the user's reasoning process, proof structures are fully editable after their initial creation, subject to the constraints built into the architecture. So, for example, implementations will typically allow existing nodes to be deleted, new nodes to be inserted at any point in a proof (for example, between two existing nodes of an embedded subproof), and cases (subproofs) to be added to or deleted from an existing set of cases. A set of cases attached to the node are generally interpreted disjunctively, that is, as representing a range of possible alternatives.

Implementations of the invention may or may not provide the user with an explicit representation of the underlying proof structure, analogous to those that we have used in the illustrative figures. Implementations must, however, provide the user with a means of navigating within the proof structure, that is, a means of accessing the representations attached to the various nodes of the proof. As we have seen, the operations a user is permitted to perform on graphical representations depend crucially on the node from which the operations are performed. In addition, the displayed information of a graphical representation depends on the node from which the representation is viewed. For these reasons, implementations will typically maintain a record of which node the user is located at, the user focus, for purposes of display and editing. Proof navigation mechanisms allow the user to change the focus from one node to another.

Since proofs may contain a large number of nodes, and any given node may contain information presented by several forms of representation, it will often be impractical for an implementation of the invention to display simultaneously the information available at all of the nodes (or even more than one node) in a proof. Consequently, some applications of the invention will restrict the information displayed at any given time to the information explicitly represented at the node in focus, or alternatively, to the information available in the provenance of the node of focus.

Figure 14:
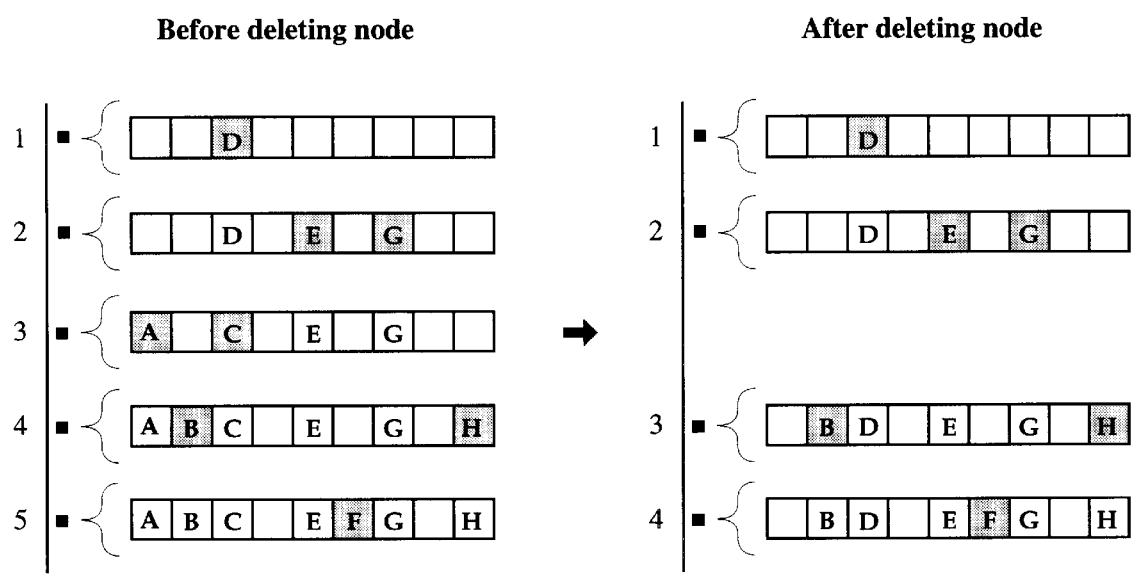
FIG. 14 shows the effect of deleting a node containing incremental information, in accordance with the teaching of the invention.

Since the display of graphics in a proof is determined by the original edit at the node of origin plus a sequence of incremental edits at later nodes, the deletion of a node in an existing proof can change the graphics displayed at subsequent nodes. FIG. 14 illustrates the impact of deleting a node containing modifications to a graphical representation. In this figure, we assume that all of the modifications made to the original graphic are unconstrained incremental edits. After deleting node 3, where the values A and C were introduced into the first and third squares, descendant graphics no longer display the effects of these modifications. Thus at the final node, the first attribute is blank after the deletion, while the third attribute inherits the value D from an earlier graphic.

Justification, Rules and Verification

Each node in a proof can additionally be tagged with annotations. In some implementations of the invention, annotations comprise unstructured comments added by the user. Other implementations will permit structured annotations called justifications or declarations. A justification is defined as a rule or principle supplied by the system or the user which licenses the reasoning step represented by that node, plus a (possibly empty) set of supports. A support is a reference to a node accessible from the tagged node which provides a necessary precondition for the application of the rule or principle in question.

The annotation mechanism allows the user to explain and justify the incremental information introduced at a node. But this incremental information is not the only information available at that stage in the reasoning. The accessibility relation defines the paths of legitimate information inheritance through the proof.

An implementation of the present invention can provide various levels of support for rules. An application that provides verification support for a given rule is capable of verifying the legitimacy of any purported application of the rule by the user. An application that provides partial verification support for a given rule is capable of verifying some but not all uses of the rule. An application that provides citation support for a given rule allows the user to mark, or annotate, a node as justified by the rule, but cannot verify the legitimacy of the rule's application. Finally, an application may omit the justification mechanism entirely, preserving only the proof structure of the user's reasoning and the ability to make unstructured annotations to the node.

The rules provided by an application can be either homogeneous or heterogeneous. Homogeneous rules specify legitimate reasoning steps that employ a single type of representation. Examples include rules that allow the inference of a sentence from other sentences, or the inference of a Venn diagram from other Venn diagrams. Heterogeneous rules specify legitimate reasoning steps that employ or can be applied to more than one type of representation, for example a rule that legitimates the inference of a sentence from a Venn diagram.

Typically, an application of the present invention will provide a collection of inference rules for justifying reasoning steps. It may also provide a facility for users to introduce their own rules for justifying steps.

Here we single out five important types of rules:

1) Assumption Rules

Each proof (including subproofs) contains a (possibly empty) initial sequence of nodes that provide information assumed for the remainder of the proof or subproof. These nodes are justified using an assumption rule and require no supports. An application may provide a variety of assumption rules to be used in different contexts, corresponding to different types of assumptions.

The proof illustrated in FIG. 3 uses three types of assumption rules, which we have called Given, Option, and Scenario. The first marks the information assumed in the problem; the second indicates possible choices open to the user; and the third allows the user to entertain possibilities outside his control. Steps justified by means of these different assumption rules may figure differently in other reasoning steps and procedures.

2) Transfer Rules

Transfer rules allow the transfer of information from one form of representation to another. Examples include rules that allow the user to express in sentential form information that is present in a graphical representation at an earlier accessible node, or rules that allow the modification of a graphical representation based upon information expressed in sentences at accessible nodes.

An example of a transfer rule is the Apply rule used to justify several steps in the proof illustrated in FIG. 2. In these examples, information expressed in sentential form is "applied" to the graphical representation, that is, used to justify specific modifications of that representation. Another type of transfer rule is the Observe rule, which justifies the introduction of a new sentence based on information contained in a graphical representation.

3) Case Rules

A case rule is used to justify a node that contains a set of subproofs. The most important class of case rules is what we call exhaustive cases rules. An exhaustive cases rule allows the user to break into a collection of alternatives ("cases") that are jointly exhaustive (that is, one of which must hold). The cases are specified by the initial (assumption) nodes of the subproofs contained by the node being justified. Exhaustive cases rules permit cases that are specified by various types of representation (sentential or graphical), and which are supported by nodes containing various types of representation.

FIG. 2 contains two illustrations of the use of Exhaustive Cases. The proofs illustrated in FIGS. 1 and 3 also employ implicit case rules, though the proofs have not been annotated to indicate this.

4) Promotion Rules

Promotion rules allow users to extract information from a set of exhaustive cases, that is, to promote information contained in one or more of the embedded subproofs to a subsequent node in the embedding (parent) proof. A promotion rule is used to justify a node in the parent proof and cites as support an accessible node containing a set of subproofs. One important class of promotion rules are what we call merge rules: The application of a merge rule is legitimate when the information extracted is present in each of the cases not containing a "close" declaration at any of its nodes (see below).

The last steps in FIGS. 1 and 2 both illustrate uses of a merge rule. The final step in FIG. 3 shows a different kind of promotion rule, one in which information is promoted as a consequence of the application of a metric to the various options, in this example the option with the minimum interest payment in corresponding scenarios.

Reasoning by cases is fundamentally hypothetical and disjunctive. It is hypothetical in that the reasoning within a particular case is based on assumptions that need not hold. It is disjunctive in that we are in general left with multiple open alternatives when we conclude our consideration of the cases. For this reason, promotion rules are essential if our goal is to find (and justify) a unique or optimal solution to a reasoning task.

5) Declaration Rules

Declaration rules are used to justify assertions made about the state of the proof at the node in question. Examples include declarations that a case (subproof) is closed or that a case is consistent with the information assumed in the proof. Declaration rules specify the conditions under which the declarations can be made.

Several examples of the Close rule are illustrated in FIGS. 1 and 2. These proofs also highlight the variety of reasons for which cases may be closed in the course of solving a reasoning task. In FIG. 1 cases are ruled out for aesthetic and legal reasons; in FIG. 2 cases are closed because they are inconsistent with the constraints given in the problem.

An application of the present invention may implement rules explicitly or implicitly. By this we mean that the user may or may not be required to understand and choose rules from an explicitly presented range of options. For example, an application may treat the first node in every proof or subproof as an assumption; it may treat every node containing a set of subproofs as an exhaustive range of cases; and it may contain routines that automatically apply an appropriate promotion rule in the node immediately following a range of cases.

Implementation

Those skilled in the art will appreciate that the present invention may be implemented in various different ways. In cases where it is desired to provide easy adaptation of the invention to various different end uses, the invention is preferrably implemented as a modular application framework that provides a standard set of protocols for editor, driver, and manager modules for heterogeneous reasoning systems. In addition, each specific application of the invention will supplement these modules with an appropriate suite of editing tools and rules. Although the specific implementation choices will depend upon the field of application of the invention, in many cases the core modules may be implemented as a domain-independent natural deduction proof manager plus Java-based communication protocols for modular representation editors and drivers designed to support reasoning appropriate to specific application domains. These protocols permit domain-specific and representation-specific inference rationales, and flexible goal specification and satisfaction mechanisms. Computer-aided verification of justifications and goal satisfaction can be incorporated into modules where feasible.

It will be appreciated that the present invention provides core techniques that may be adapted to provide computational support for essentially any reasoning task whose information may be represented as a digital data structure. The inventors envision various fields of application, however, which are of particular value and utility. One such field of application is large-scale architectural and engineering design. Existing CAD and/or CAAD software tools and project management software are adapted ;and integrated with the core techniques of the present invention to provide an integrated application program to support large architectural and engineering design tasks. Such an integrated application program is not necessarily based upon the modular framework discussed above.

Another valuable application of the present invention for use in solving basic analytical reasoning problems in a pedagogical and basic research setting. While Hyperproof is limited to only one non-textual, non-extensible blocks world representation, an application of the present invention can provide support for a wide range of reasoning tasks involving multiple representational forms, multiple representations in the same proof, as well as extensible representations. Such representations may include not only blocks world diagrams, but also, for example, Venn and Euler diagrams, position diagrams, Boolean truth tables, binary decision diagrams, topological diagrams, chemical structure diagrams, Feynman diagrams, and free-form sketches. In addition, support is provided for problems employing both symbolic formulas and natural language sentences.

The core techniques provided by the present invention also may be adapted and integrated with specially tailored user interface tools to help programmers author reliable intelligent agent applications. Such an application program employs several types of domain specific graphical representations to enable system development teams to reason about conversations that take place in agent-based systems, and so to improve the reliability of such systems.

Another important application of the present invention is in the field of hardware design. In this case, a system is provided for automatic and/or assisted verification of heterogeneous hardware designs.

CONCLUSION

Key features of the architecture provided by the present invention are:

1) the ability to create, modify, and navigate within a fully recursive proof structure in which sets of subproofs attached to nodes can be interpreted disjunctively;
2) the ability to create and edit multiple extensible representations attached to nodes of the proof, including at least one form of graphical representation;
3) support for at least one form of incremental editing of graphical representations; and
4) the ability to attach annotations to some or all nodes of a proof.

An application based on the present invention may also provide a wide range of additional features and operations, including some or all of the following:

5) Permanent storage of proofs.

The application may provide a means to save completed or partial proofs to permanent storage (disk or other permanent media), and a means by which saved proofs may be recalled from permanent storage.

6) Graphical display of proof structure.

Navigation through a proof may involve provision of an explicit representation of the proof structure to the user or may involve mechanisms that allow the user to navigate through a structure that is not explicitly presented to the user.

If the proof structure is displayed explicitly, the application may allow proofs to be depicted at various levels of granularity, so as to make them comprehensible both in overall form but also, upon demand, in full detail. For example, it may be possible to collapse the graphical representation of a subproof to a single icon, or to a representation in which only selected nodes are displayed.

7) Rules and proof checking.

The application may implement various levels of support for inference rules and may implement this support explicitly or implicitly.

8) Goals.

The application may allow the specification of reasoning goals that are to be satisfied by a proof. Applications that implement goals may specify conditions under which the goals are satisfied, and may implement routines for verifying that a goal has been satisfied by a completed proof.

9) Suspending steps.

The application may allow the user to explore the consequences of suspending the information at one or more nodes of a proof. When a node is suspended, the display will be updated to indicate all subsequent nodes that recursively depend on that node (i.e., for which the node is cited in support).

10) Demoting steps.

The application may, in appropriate circumstances, allow the representation contained by a node in a proof to be demoted to the assumption step of a subproof contained at that node. A step cannot be demoted if this would result in violations of restrictions on support structure or graphic inheritance.

11) Splicing steps.

When a sequence of modifications is made to a graphic at a single node, the application may allow the user to divide the modifications into two groups, the first applying to the graphic at the original node, the second applying to a newly created graphic at the successor node. This feature allows the user to refine his or her reasoning, adding further articulation to the steps in the reasoning.

12) Adding background assumptions.

The application may allow the user, during the construction of a proof, to conveniently add new background assumptions required to justify a particular step in the reasoning. These assumptions may be added to an appropriate, initial node of the proof without requiring the user to explicitly navigate to that node.

In conclusion, it will be clear to one skilled in the art that the present inventors have provided new and useful techniques and methods having a broad range of possible applications. Many alterations of and additions to the specifics described above will be obvious to those skilled in the art without departing from the scope of the invention. Accordingly, the scope of the invention should be determined by the following claims and their legal equivalents.

What is claimed is:

1. A computer implemented method for assisting a user engaged in a reasoning task, the method comprising:
   a) storing in a memory a data structure comprising:
      i) a partially ordered set of nodes comprising a set of nodes N and a partial ordering of N,
      ii) a set R of representations, wherein at least one representation r in R is a graphical representation comprising a set of edits $d_0, \ldots, d_L$, wherein $L \geq 0$, and
      iii) a function $f: r \rightarrow N$ assigning to each edit $d_i$ in r an associated node $f(d_i)$ in N, wherein $f(d_i) \geq f(d_0)$ for all i;

b) displaying to the user an instance r[n] of the representation r at a user-selected node n, wherein the instance r[n]=$\{d_i$ in r such that $n \geq f(d_i) \geq f(d_0)\}$;

c) receiving from the user an instruction to introduce at the node n in N an edit $d_{L+1}$ to the graphical representation r; and d) modifying the data structure to introduce at n the edit $d_{L+1}$ to r, provided:
   i) $n \geq f(d_0)$; and
   ii) r is extensible, or $n = f(d_0)$, or the edit $d_{L+1}$ at n does not extend r.

2. The method of claim 1 wherein the edit $d_0$ of the graphical representation r comprises a set of graphical objects, wherein each graphical object comprises a set of attributes, wherein each attribute comprises an attribute value range, and wherein condition d) ii) fails if 1) r is defined to be a non-extensible representation, and 2) $n \neq f(d_0)$, and 3) one or more of the following propositions is true:
   a) the edit $d_{L+1}$ adds an object to r;
   b) the edit $d_{L+1}$ deletes an object of r;
   c) the edit $d_{L+1}$ adds an attribute to an object of r;
   d) the edit $d_{L+1}$ deletes an attribute of an object of r; and
   e) the edit $d_{L+1}$ extends an attribute value range of an attribute of an object of r.

3. The method of claim 1 wherein the set R of representations is a heterogeneous set of representations comprising at least two distinct representational forms selected from the group consisting of a spreadsheet, a CAD drawing, a chemical structure diagram, a topological diagram, a Feynman diagram, an electrical schematic, an architectural drawing, an artistic drawing, a 3D model, an animation, a motion picture, a table, a Venn diagram, a Euler diagram, a blocks world diagram, a position diagram, a Boolean truth table, a binary decision diagram, a graph, a flowchart, a mathematical sentence, a computer program, a logical sentence, and a linguistic expression.

4. The method of claim 1 wherein the edit $d_{L+1}$ of r comprises an edit selected from the group consisting of:
   a) an addition of an object to r;
   b) a deletion of an object from r;
   c) an addition of an attribute to an object of r;
   d) a deletion of an attribute of an object of r;
   e) an extension of an attribute value range of an attribute of an object of r;
   f) a partial restriction of an attribute value range of an attribute of an object of r;
   g) a complete restriction of an attribute value range of an attribute of an object of r; and
   h) a specification of an attribute value within an attribute value range of an attribute of an object of r.

5. The method of claim 1 wherein the method further comprises the step of determining if the data structure satisfies a condition of the reasoning task.

6. The method of claim 1 wherein the condition of the reasoning task is selected from the group consisting of a logical inference rule, a goal of the reasoning task.

7. The method of claim 1 further comprising the step of modifying the partially ordered set of nodes by a structural edit, wherein the structural edit is chosen from the group consisting of a deletion of a node in the set N, an addition of a node to the set N, and a change in partial ordering on the set N.

* * * * *